(12) United States Patent
Sweet

(10) Patent No.: US 6,913,304 B1
(45) Date of Patent: Jul. 5, 2005

(54) DUAL-COMPARTMENT STORAGE APPARATUS FOR A TRUCK BED WITH RECEIVING ZONE FOR BI-WHEELED VEHICLE AND COLLAPSIBLE RAMP STOWED IN RAMP STORAGE COMPARTMENT

(76) Inventor: Neil R. Sweet, 3307 E. Tyler Rd., Twin Lakes, MI (US) 49457

( * ) Notice: Subject to any disclaimer, the term of this patent is extended or adjusted under 35 U.S.C. 154(b) by 39 days.

(21) Appl. No.: 10/676,644

(22) Filed: Oct. 2, 2003

(51) Int. Cl.$^7$ .............................................. B60R 16/00
(52) U.S. Cl. ........................... 296/37.6; 211/5; 211/20; 224/42.13
(58) Field of Search .......................... 296/37.6; 211/5, 211/17, 20, 22, 23; 224/42.11, 42.13, 42.32, 224/42.33, 42.39

(56) References Cited

U.S. PATENT DOCUMENTS

| 3,820,662 | A | * | 6/1974 | Steers ............................ 211/5 |
| 3,963,129 | A | | 6/1976 | Clayton |
| 4,034,872 | A | | 7/1977 | Jager |
| 4,256,340 | A | * | 3/1981 | Dunchock ................. 296/37.15 |
| 4,288,011 | A | * | 9/1981 | Grossman ................... 296/37.6 |
| 4,488,669 | A | * | 12/1984 | Waters ....................... 296/37.6 |
| 4,921,152 | A | | 5/1990 | Kemming |
| 4,932,829 | A | | 6/1990 | Miller |
| 5,730,577 | A | | 3/1998 | Jones |
| 6,176,672 | B1 | | 1/2001 | Egan et al. |
| 6,186,727 | B1 | | 2/2001 | Hamilton |
| 2002/0094261 | A1 | * | 7/2002 | Fischer et al. ............... 414/537 |

* cited by examiner

Primary Examiner—Lori L. Coletta
(74) Attorney, Agent, or Firm—John D. Gugliotta; Olen L. York, III

(57) ABSTRACT

A dual-compartment storage apparatus is a toolbox system for pickup trucks with a recessed receiving zone in the middle, wherein a wheel of a motorcycle to fit into the receiving zone and allows the entire motorcycle to fit in into the truck bed. Additionally, the tool box provides tie-down points to secure the motorcycle during transport and prevent it from moving about. Finally, a storage compartment across the back of the box holds a collapsible ramp to allow the motorcycle to roll into and out of the bed with a minimum of effort.

11 Claims, 6 Drawing Sheets

DUAL-COMPARTMENT STORAGE APPARATUS FOR A TRUCK BED WITH RECEIVING ZONE FOR BI-WHEELED VEHICLE AND COLLAPSIBLE RAMP STOWED IN RAMP STORAGE COMPARTMENT

RELATED APPLICATIONS

The present invention was first described in Disclosure Document Registration 526,123 filed on Feb. 13, 2003 under 35 U.S.C. §122, 37 C.F.R. §1.14 and MPEP § 1706. There are no previously filed, nor currently any co-pending applications, anywhere in the world.

BACKGROUND OF THE INVENTION

1. Field of the Invention

The present invention relates generally to dual compartment storage apparatuses for trucks, and more particularly, to a storage apparatus having two compartments spaced about a receiving zone for a wheel, wherein the compartments are suspendingly elevated above the plane of the cargo bed, and is accompanied by a collapsible ramp that is storable in a ramp storage compartment.

2. Description of the Related Art

With sales at an all-time high, the popularity of the pick-up style truck as an everyday vehicle is more wide spread than it ever has been. Their utility and convenience in hauling items coupled with the availability of luxury interiors and extended cab space have made the pickup a popular alternative to other vehicles. The availability of aftermarket accessories also enhances the attractiveness of pickup trucks as well. Perhaps one of the most common accessories is that of the "behind-the-cab" type toolbox, for carrying tools and other smaller objects. However, these tool boxes shorten the available bed space, which becomes a problem for those hauling large, long items such as motorcycles. Typically, the tool box must be removed which takes time and reduces its versatility. Accordingly, the need has arisen for a means by which the functionality of a bed mounted tool box can be enjoyed without affecting the pickup trucks ability to carry large items such as motorcycles. The development of the present invention fulfills this need.

A search of the prior art did not disclose any patents that read directly on the claims of the instant invention; however, the following references were considered related:

U.S. Pat. No. 3,963,129, issued in the name of Clayton, discloses a motorcycle carrier comprising a crane mounted to a truck with a power-winch actuated lift cable;

U.S. Pat. No. 4,034,872, issued in the name of Jager, discloses a motorcycle rack adapted for mounting to a tow truck comprising a V-shaped bracket and a cross-bar;

U.S. Pat. No. 4,932,829, issued in the name of Miller, discloses an articulated motorcycle carrier pivotally mounted and engaged with the bed of a truck;

U.S. Pat. No. 4,921,152, issued in the name of Kemming, discloses a combination storage container and motorcycle holder comprising two spaced apart storage compartments, the space therebetween for receiving the wheel of a motorcycle;

U.S. Pat. No. 5,730,577, issued in the name of Jones, discloses a motorcycle loading and unloading device comprising a ramp having a pair of spaced, parallel ramp rails;

U.S. Pat. No. 6,176,672, issued in the name of Egan et al., discloses a telescoping personal motorcycle support structure comprising a support frame mountable to the bed of a truck which supports at least one telescoping, pivotal ramp assembly; and U.S. Pat. No. 6,186,727, issued in the name of Hamilton, discloses an apparatus and method of transporting motorcycles comprising front and rear chocks respectively coupled to dollies.

Consequently, there exists a continuous need for new product ideas and enhancements for existing products in the motorcycle transporting industry.

SUMMARY OF THE INVENTION

It is therefore an object of the present invention to provide a dual storage compartment apparatus for a truck bed with a receiving zone for a wheel of a vehicle, a collapsible ramp and a ramp storage compartment for the ramp when not in use.

It is an object of the present invention to provide a storage apparatus wherein each storage compartment is enclosed by an articulating lid.

It is another object of the present invention to provide a storage apparatus wherein each storage compartment includes a removable tray comprising compartments for individualized and specialized storage of smaller objects.

It is another object of the present invention to provide a storage apparatus wherein each storage compartment comprises an upper anchoring plate and a lower anchoring plate, the upper anchoring plate for attachment to the sidewalls of a cargo area, and for receiving an option cap, the lower anchoring plate for attachment to the cargo bed of the cargo area. The upper anchoring plate and lower anchoring plate cooperatively act together to securely hold the storage apparatus in position during transport and use.

It is another object of the present invention to provide a storage apparatus wherein each storage compartment comprises at least one channel and a dowel, the channel and dowel provided for attaching straps, cables, rope or other similar items thereto, circumscribing an object, and then attaching to a channel and dowel of the opposite storage compartment.

It is another object of the present invention to provide a storage apparatus wherein each storage compartment comprises a first storage cell and a second storage cell, the first storage cell accessible via the articulating lid, the second storage cell accessible via an articulating door, the lid and door articulating in planes perpendicular to one another.

It is another object of the present invention to provide a storage apparatus comprising an optional cap for covering the storage apparatus, the cap comprising a wheel well for accommodating the wheel of a vehicle to be transported by the truck.

It is another object of the present invention to provide a storage apparatus comprising a retractable cable with lock, the retraction reel housed within the storage compartment, and the cable penetrating an orifice provided in the rear wall of the storage compartment.

Briefly described according to one embodiment of the present invention, a dual-compartment storage apparatus is a toolbox system for pickup trucks with a recessed receiving zone in the middle. It is designed to allow the wheel of a motorcycle to fit into the slot and thus allows the entire motorcycle to fit in into the truck bed. The receiving zone accepts a tire of a motorcycle or bicycle, thus allowing the entire motorcycle to fit into the bed of the truck, which is usually impossible with a conventional tool box placed within the cargo area of a truck. Additionally, the tool box provides tie-down points to secure the motorcycle during transport and prevent it from moving about. Finally, a storage compartment across the back of the box holds a collapsible ramp to allow the motorcycle to roll into and out of the bed with a minimum of effort.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
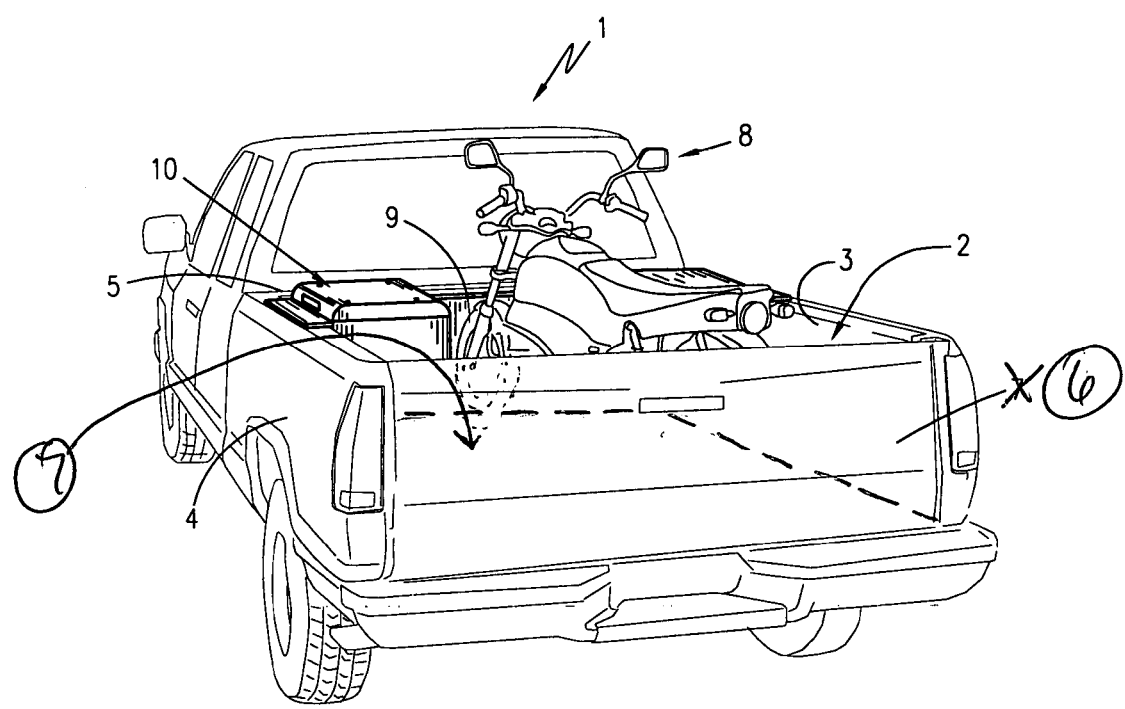
FIG. 1 is a perspective view of the storage apparatus affixed within the cargo area of a truck.
Figure 2:
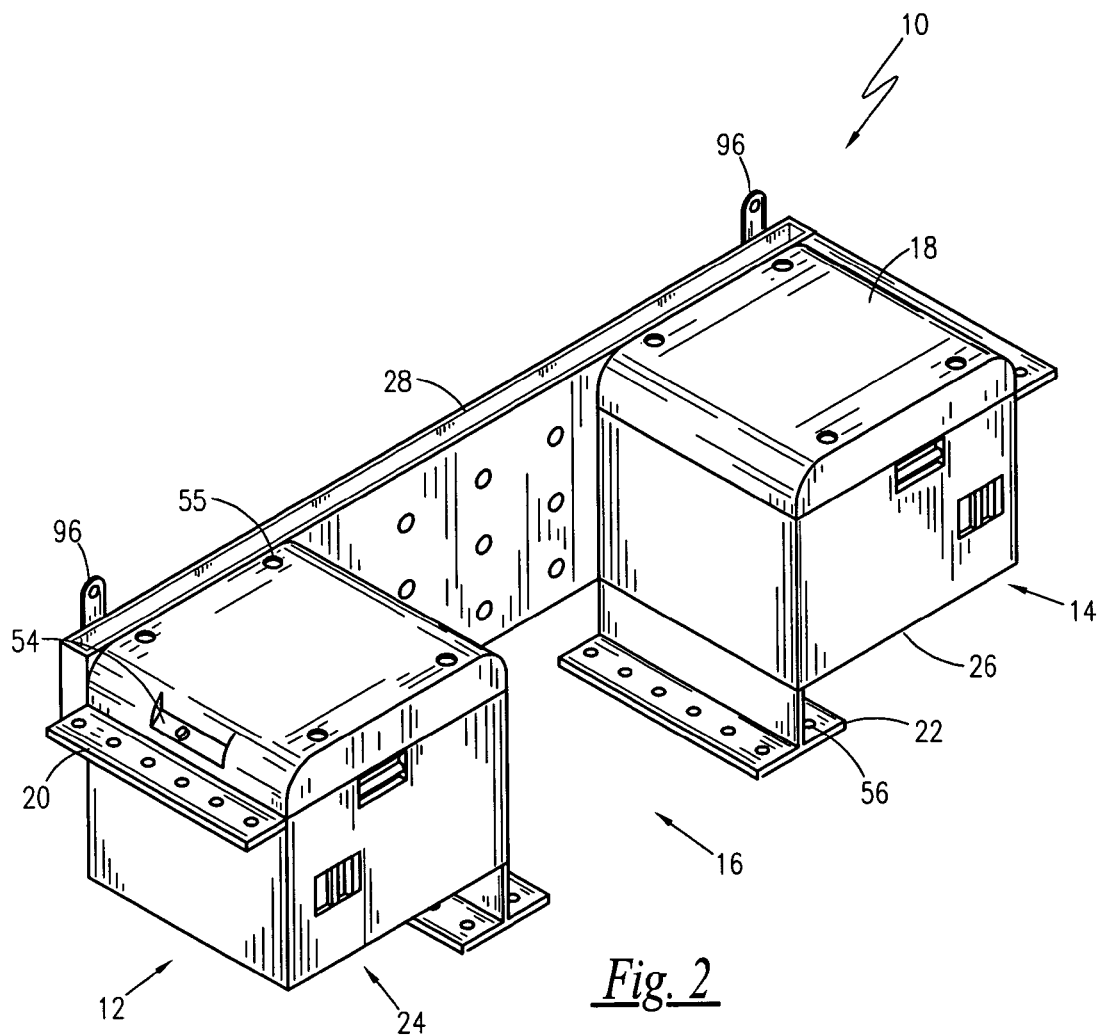
FIG. 2 is a perspective view of the storage apparatus.

The best mode for carrying out the invention is presented in terms of its preferred embodiment, herein depicted within FIGS. 1 through 6.

1. Detailed Description of the Figures

Referring now to FIG. 1 through FIG. 4 and FIG. 6, a storage apparatus 10 is shown in accordance with a preferred embodiment of the present invention. The storage apparatus 10 is placed within and affixed to the cargo area 2 of a truck 1. The cargo area 2 is defined by a pair of parallel sidewalls 3 and 4 each depending from a forward wall 5, and a pivotal tail wall (tailgate) 6 parallel to the forward wall 5. The sidewalls 3 and 4, the forward wall 5 and the tailgate 6 each depend from a cargo bed 7. The storage apparatus 10 comprises two spaced apart storage compartments 12 and 14 and a receiving zone 16 intermediately therebetween. Each one of the storage compartments 12 and 14 comprises an articulating lid 18, an upper anchoring plate 20 and a lower anchoring plate 22, wherein each one of the storage compartments 12 and 14 is suspendingly elevated above the cargo bed 7 and forms a storage space 24 and 26 therebetween. A ramp storage compartment 28 is externally coupled to the storage compartments 12 and 14, and adjacently engages the forward wall 5 of the cargo area 2 when the storage apparatus 10 is positioned. A collapsible ramp 30 for facilitating loading onto and unloading from the cargo area 2 is provided. The ramp 30 is storable in the ramp storage compartment 28.

Figure 3:
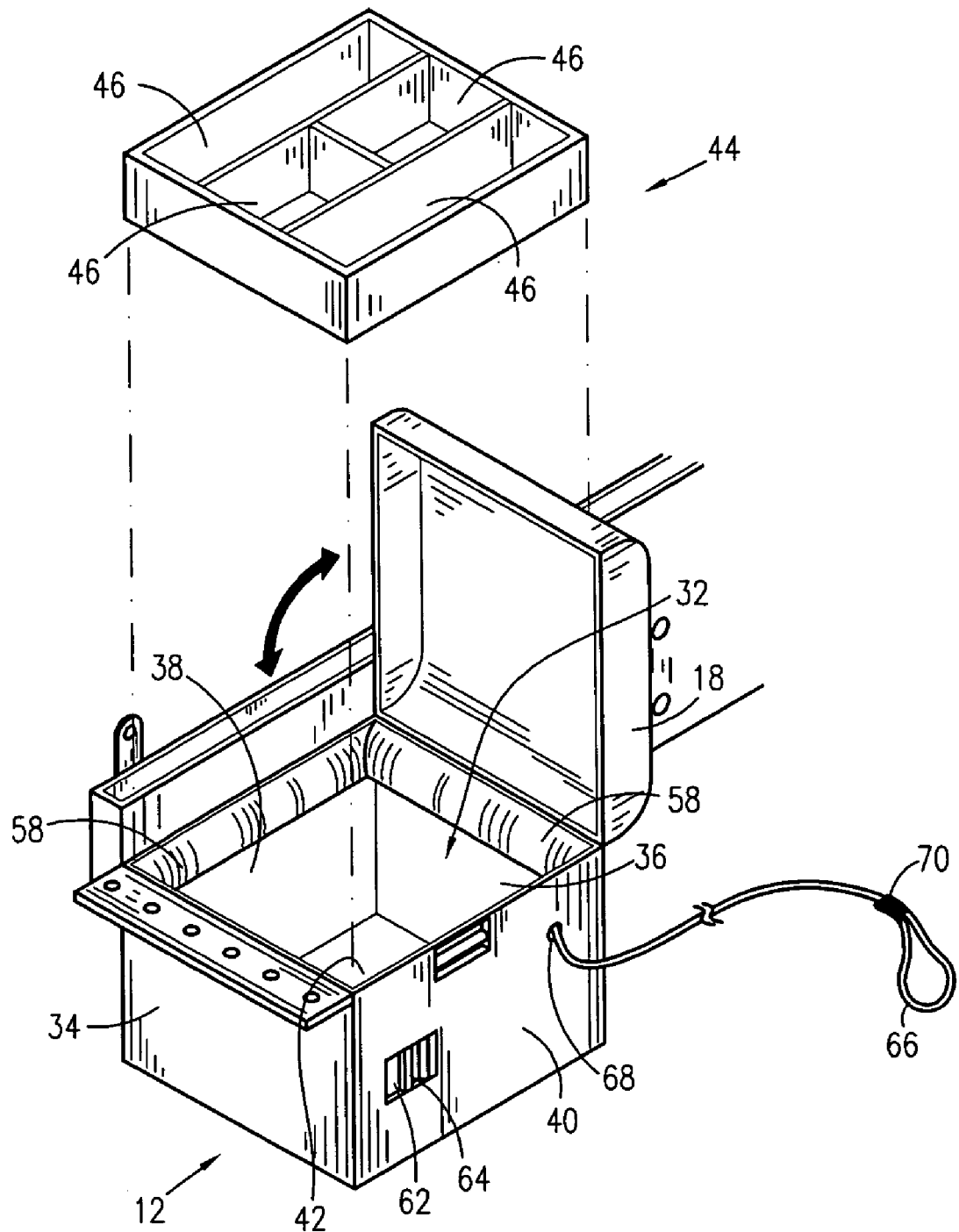
FIG. 3 is a perspective view of a single storage compartment serving as a representative model for each storage compartment, the removable tray exploded from storage and illustrating contours within the interior of the walls of a compartment.
Figure 4:
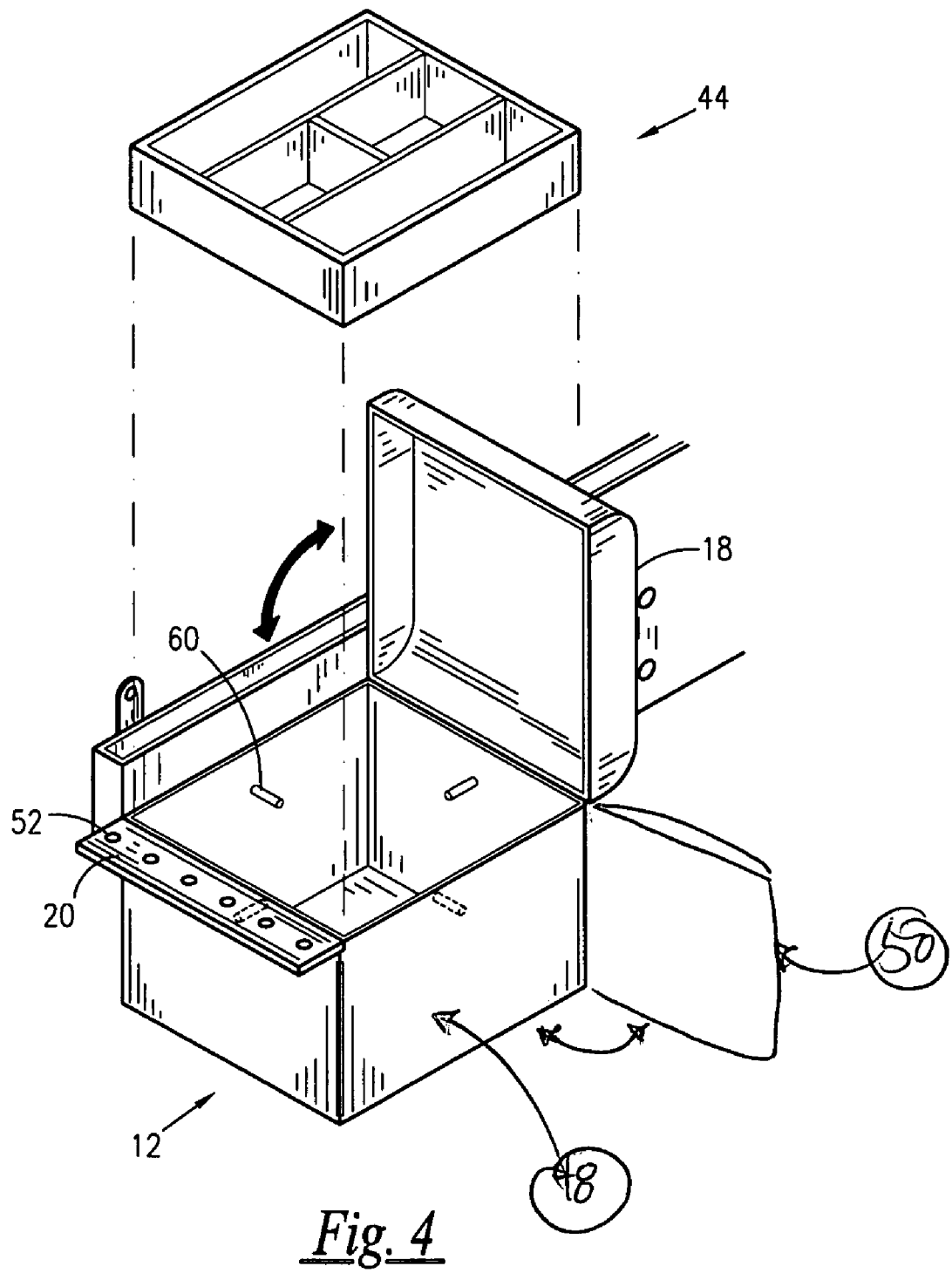
FIG. 4 is a perspective view of a single storage compartment illustrating optional pegs that might be used to hold the tray.

The storage compartments 12 and 14 are mirror images of one another, therefore description of one storage compartment serves as a representative model of the other storage compartment. Each storage compartment 12 or 14 comprises at least one storage cell 32 formed by four upstanding walls 34, 36, 38 and 40 (an exterior sidewall 34, an interior sidewall 36, a front wall 38 and a rear wall 40, specifically) depending from a floor 42. The storage cell 32 is accessible via the articulating lid 18 (articulating via at least one hinge, or a plurality of hinges, commonly known in the art), wherein the lid 18 may be a spring-loaded lid 18 actuated by a push button lock 54 recessed and set at an approximate forty-five degree (45°) angle along the outer perimeter of lid 18. In another embodiment, the lid 18 may include at least one or a plurality of handles for grasping and articulating the lid 18. It is envisioned that the lid 18 may also include a plurality of slots 55 provided in the top corners of the lid 18 for securement of bungee or other similar securing devices. It is also envisioned that a removable storage tray 44 may be provided, the tray 44 suspendingly resting near or at the top of the storage cell 32 via mateable hooks and pegs 60 (pegs shown in FIG. 4), integral channels and pegs, interference and gravity impingement by contours 58 provided along the interior of the upstanding walls 34, 36, 38 and 40 (as shown in FIG. 3), or other similar means for suspending the tray 44 at the proscribed profile. The tray 44 is envisioned as having a plurality of compartments 46 for storing a plurality of items therein. It is further envisioned that a second storage cell 48 may be provided in addition to the first storage cell 32. The first storage cell 32 remains accessible via the lid 18 (articulating in a plane parallel to the cargo bed 7), while the second storage cell 48 is envisioned as accessible via the lid 18 (as shown in FIG. 3) or an articulating door 50 (articulating in a plane perpendicular to the cargo bed 7 via at least one hinge, or a plurality of hinges, commonly known in the art, shown in FIG. 4). In a two storage cell 32 and 48 arrangement, it is envisioned that the first storage cell 32 assumes an upper profile, while the second storage cell 48 assumes a lower profile, thereby providing two sources of enclosed storage easily accessible via articulating lids 18 and/or doors 50, respectively, and also providing the opportunity for convenience by allowing multiple users to access separate cells 32 and 48 simultaneously to retrieve stowed objects and/or items. In another embodiment, the doors 50 are permanently affixed to the storage compartments 12 and 14 so as to provide a secure structure for attachment of straps, bands, rope or other similar means for securing objects to the channels 62 and dowels 64.

Each of the storage compartments 12 and 14 also include an upper anchoring plate 20 and a lower anchoring plate 22. The upper anchoring plate 20 depends from an exterior sidewall 34 of a storage compartment 12 or 14. It is envisioned that one arrangement of the upper anchoring plate 20 is coextensive with the top of the exterior sidewall 34 and depending perpendicularly therefrom. The upper anchoring plate 20 comprises a plurality of apertures 52 for attachment of the upper anchoring plate 20 to a sidewall 3 or 4. Furthermore, the apertures 52 allow for attachment of a bed top (not shown, but known in the art as substantially orthogonal apparatus secured to the bed of a pick up truck for enclosing the bed and protecting the contents from environmental elements). The lower anchoring plate 22 depends from an interior sidewall 36 and includes a plurality of apertures 56 for attaching the lower anchoring plate 22 to the cargo bed 7. The lower anchoring plate 22 is dimensioned so as to suspendingly elevate the storage compartments 12 and/or 14 above the plane of the cargo bed 7. The suspended elevation of the storage compartments 12 and 14 form additional storage spaces 24 and 26 between the floor 42 of each storage compartment 12 and 14 and the cargo bed 7. These storage spaces 24 and 26 are envisioned as accommodating items, such as boards, pipe or other items of length that might not otherwise fit into the cargo area 2 without the additional length and space provided by the storage spaces 24 and 26. By way of example only, and not intended as a limitation of the scope of the claims, additional wooden boards used for loading, of a length between six (6) feet and eight (8) feet, are comfortably accommodated in the cargo area 2 by sliding the boards lengthwise into the storage spaces 24 and 26, and allowing for the tailgate 6 to fully and securely close against the sidewalls 3 and 4, as intended.

Along one of the upstanding walls 40 (rear wall 40), a plurality of channels 62 are provided, wherein each one of said plurality of channels 62 comprise at least one dowel 64. Cooperatively, the channels 62 and dowels 64 act in permitting attachment of straps, bands, rope and other means of securement, so that these means are attachable to each of the storage compartments 12 and 14. By way of example only, and not intended as a limitation on the scope of the claims, a nylon strap might be attached to one channel 62 and dowel 64 of storage compartment 12, and the strap then circumscribed about an object that might otherwise shift during transport (such as a motorcycle), and then the strap may be attached to a channel 62 and dowel 64 on the opposite storage compartment 14.

Further envisioned along the upstanding wall 40 (rear wall 40) is a lockable cable 66 for securing a wheel 9 of a vehicle 8. The lockable cable 66 retractably affixed to at least one of the storage compartments 12 or 14. The cable 66 is envisioned as retractable by a spring-biased reel commonly known in the art of retractable reels. The reel is envisioned as being housed within the storage compartments 12 and 14, protecting the reels from tampering and environmental changes. The cable 66 is envisioned as penetrating an orifice 68 formed in the rear wall 40. The lock 70 provided on the cable 66 provides a two-fold function, first, securely connecting the cable 66 between the storage compartments 12 and 14, and second, discouraging theft of the object secured by the cable 66. The lock 70 is envisioned as either a key lock commonly known in the art, or a combination lock of the varieties commonly known in the art.

Figure 5A:
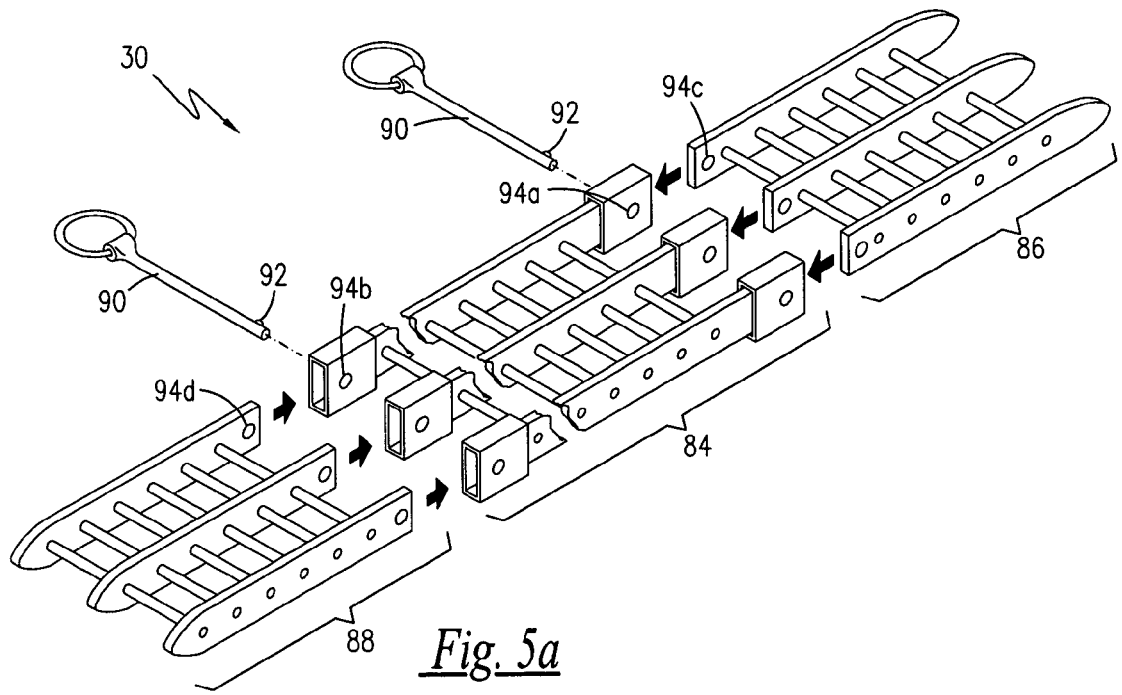
FIG. 5a is an exploded perspective of the ramp.
Figure 5B:
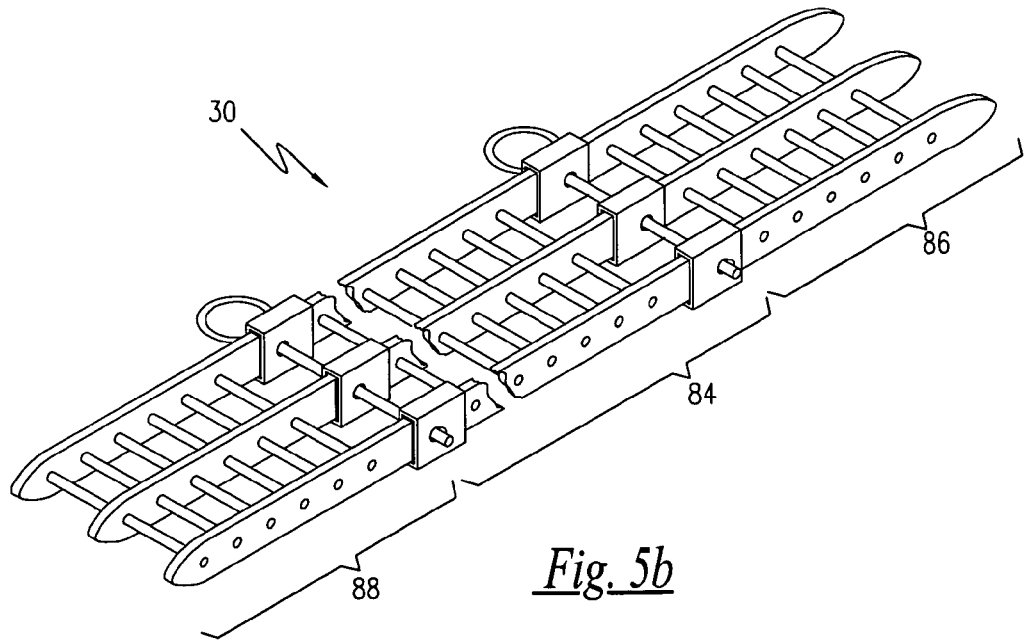
FIG. 5b is a perspective view of the ramp assembled.
Figure 6:
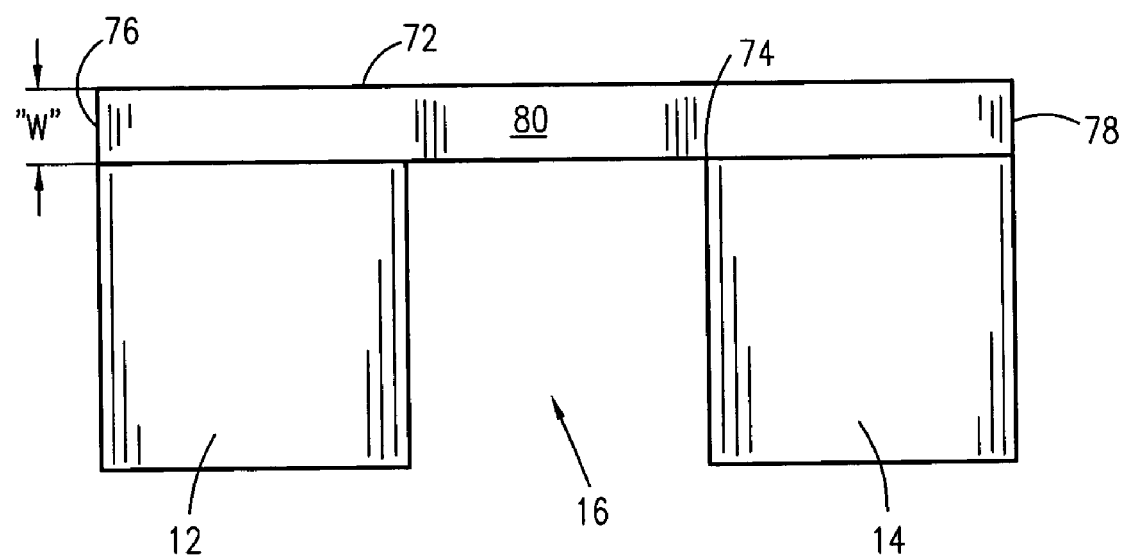
FIG. 6 is a top view of the storage apparatus illustrating the ramp storage compartment configuration.

Referring now to FIG. 5a and FIG. 5b, the ramp 30 comprises an intermediate section 84, an upper section 86 detachably affixed to an end of the intermediate section, and a lower section 88 detachably affixed to an end of the intermediate section 84 opposite of the upper section 86. The upper section 86 and lower section 88 are collapsible about the intermediate section 84, either by foldably pivoting along locking pins 90 inserted to couple the upper section 86 to the intermediate section 84 and the lower section 88 to the intermediate section 84, respectively, or by removal of the locking pins 90 and laying the sections 84, 86 and 88, respectively, upon one another. The locking pins 90 are envisioned as having an outwardly biased ball bearing 92 (biased by a spring, commonly known in the art). The pins 90 are inserted through pin apertures 94a, 94b, 94c and 94d formed in the intermediate, upper and lower sections 84, 86 and 88, respectively. Pin apertures 94a are aligned with either pin apertures 94c or 94d with a pin 90 inserted therethrough, connecting either the upper or lower section 86 or 88 with intermediate section 84 via complimentary fit. Pin apertures 94b are aligned with the remaining pin apertues 94c or 94d with a pin 90 inserted therethrough, connecting either the upper or lower section 86 or 88 with intermediate section 84 via complimentary fit. The pins 90 act to maintain the three sections 84, 86 and 88 in a relatively planar configuration so that ingress and egress from the cargo area 2 is easily achieved and the integrity of the ramp 30 is maintained. The ramp 30 allows for the loading and unloading of material to and from the cargo area 2 of a truck 1, and then after use, the convenient storage of the ramp 30 without consuming valuable space.

Ramp storage compartment 28 is externally coupled to the storage compartments 12 and 14 along an upstanding wall 38 (front wall 38). The ramp storage compartment 28 comprises four upstanding walls 72, 74, 76 and 78 depending from a base wall 80. The walls 72, 74, 76, 78 and 80 are arranged and dimensioned so as accommodate the ramp 30 in a foldably collapsed arrangement. Thus, the ramp storage compartment 28 is envisioned to have a longitudinal width ("w") of no greater than six (6) inches, with lesser widths envisioned to conserve space and materials. The ramp storage compartment 28 further comprises at least one attachment tab 96 affixed to the ramp storage compartment 28, wherein at least one attachment tab 96 is provided for affixing the storage apparatus 10 to the forward wall 5 of the truck 1.

2. Operation of the Preferred Embodiment

To use the present invention, in accordance with a preferred embodiment of the present invention, a user will affix the storage apparatus 10 to the cargo area 2 of a truck 1 by permanent or semi-permanent attachment of threaded screws or bolts through the upper anchoring plates 20 into the sidewalls 3 and 4, through the lower anchoring plates 22 into the cargo bed 7, and through at least one attachment tab 92 into the forward wall 5. By securing the storage apparatus 10 in this manner, the storage compartments 12 and 14 are suspendingly elevated above the plane of the cargo bed 7, providing additional storage spaces 58 and 60, and retaining a receiving zone 16 for accommodate a wheel or wheels 9 of a vehicle 8.

A user may store any items that may be accommodated in the various compartments provided in the storage apparatus 10, including small hand tools, large hand tools, automatic battery powered tools, tool accessories, attachment means (such as screws, nuts, bolts, nails, tacks, etc.), containers of engine fluid (such as motor oil, two-cycle oil, transmission fluid, power steering fluid, anti-freeze, windshield wiper fluid, water, etc.).

A user may store a bi-wheeled vehicle 8, such as a motorcycle, moped or bicycle, by assembling the ramp 30 at the tailgate 6 so that the bi-wheeled vehicle may be rolled onto the cargo bed 7. The user will then place the wheel 9 into the receiving zone 16 and secure the wheel 9 in place via the lockable cable 66. The user can then disassemble the ramp 30 and store in the ramp storage compartment 28. The user may then transport the vehicle 8 safely without concern for shifting or tipping of the vehicle 8.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

What is claimed is:

1. In a truck storage apparatus positioned adjacently to a forward wall of the cargo area of a truck, said cargo area defined by a pair of parallel sidewalls each depending from said forward wall, and a pivotal tailgate parallel to said forward wall, said sidewalls, said forward wall and said pivotal tailgate depending from a cargo bed, said storage apparatus comprising two spaced apart storage compartments and a receiving zone intermediately therebetween, the improvement comprising:

each one of said storage compartments comprises an articulating lid, an upper anchoring plate and a lower anchoring plate, each one of said storage compartments suspendingly elevated above said cargo bed and forming storage space therebetween;

a ramp storage compartment externally coupled to said storage compartments and adjacently engaging said forward wall; and a collapsible ramp for facilitating loading onto and unloading from said cargo area, said ramp storable in said ramp storage compartment.

2. The improvement of claim 1, wherein each one of said storage compartments comprise at least one storage cell enclosed by said lid.

3. The improvement of claim 2 further comprising a removable tray comprising a plurality of compartments for storing a plurality of items, said tray housed within said at least one storage cell.

4. The improvement of claim 1, wherein said upper anchoring plate depends from an exterior sidewall of said storage compartment.

5. The improvement of claim 1, wherein said lower anchoring plate depends from an interior sidewall of said storage compartment.

6. The improvement of claim 1, wherein said lower anchoring plate is affixed to said cargo bed, said lower anchoring plate suspendingly elevating said storage compartment and forming said storage space.

7. The improvement of claim 1, wherein said storage space permits slidable insertion of items between said cargo bed and said storage compartment.

8. The improvement of claim 1 further comprising a plurality of channels, wherein each one of said plurality of channels comprise at least one dowel cooperatively permitting attachment of straps, bands and rope attachable to each of said storage compartments.

9. The improvement of claim 1 further comprising a lockable cable for securing a wheel of a vehicle, said lockable cable retractably affixed to at least one of said storage compartments.

10. The improvement of claim 1 further comprising at least one attachment tab affixed to said ramp storage compartment, said at least one attachment tab provided for affixing said storage apparatus to said forward wall.

11. The improvement of claim 1, wherein said ramp comprises:

an intermediate section;

an upper section detachably affixed to an end of said intermediate section; and a lower section detachably affixed to an end of said intermediate section opposite of said upper section.

* * * * *